June 12, 1956  E. S. THOMPSON  2,749,631
MULTIPLE, ADJUSTABLE BLADE SCRAPER
Filed Jan. 2, 1953  3 Sheets-Sheet 1
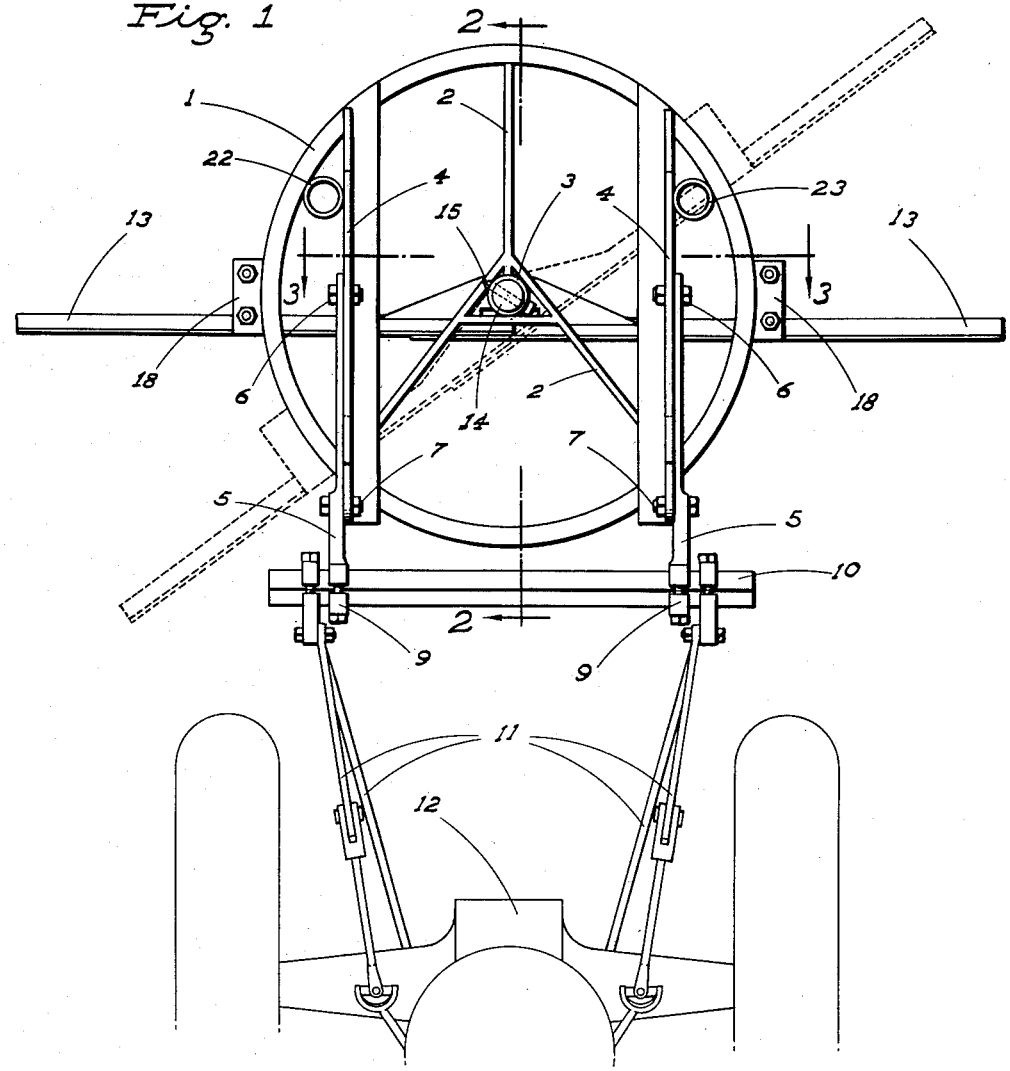
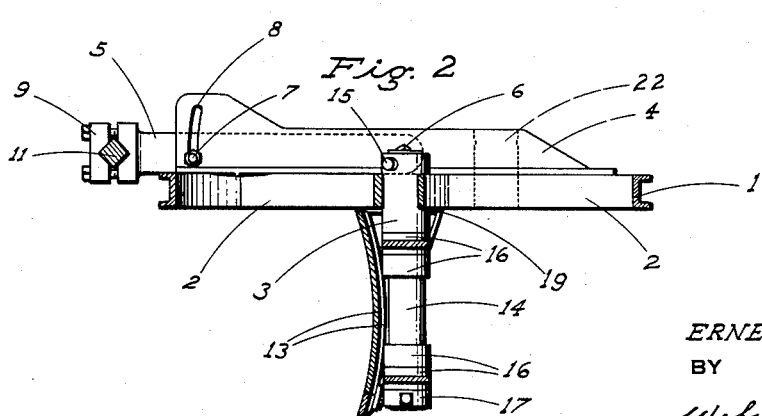
INVENTOR
ERNEST S. THOMPSON
BY
Webster & Webster
ATTORNEYS

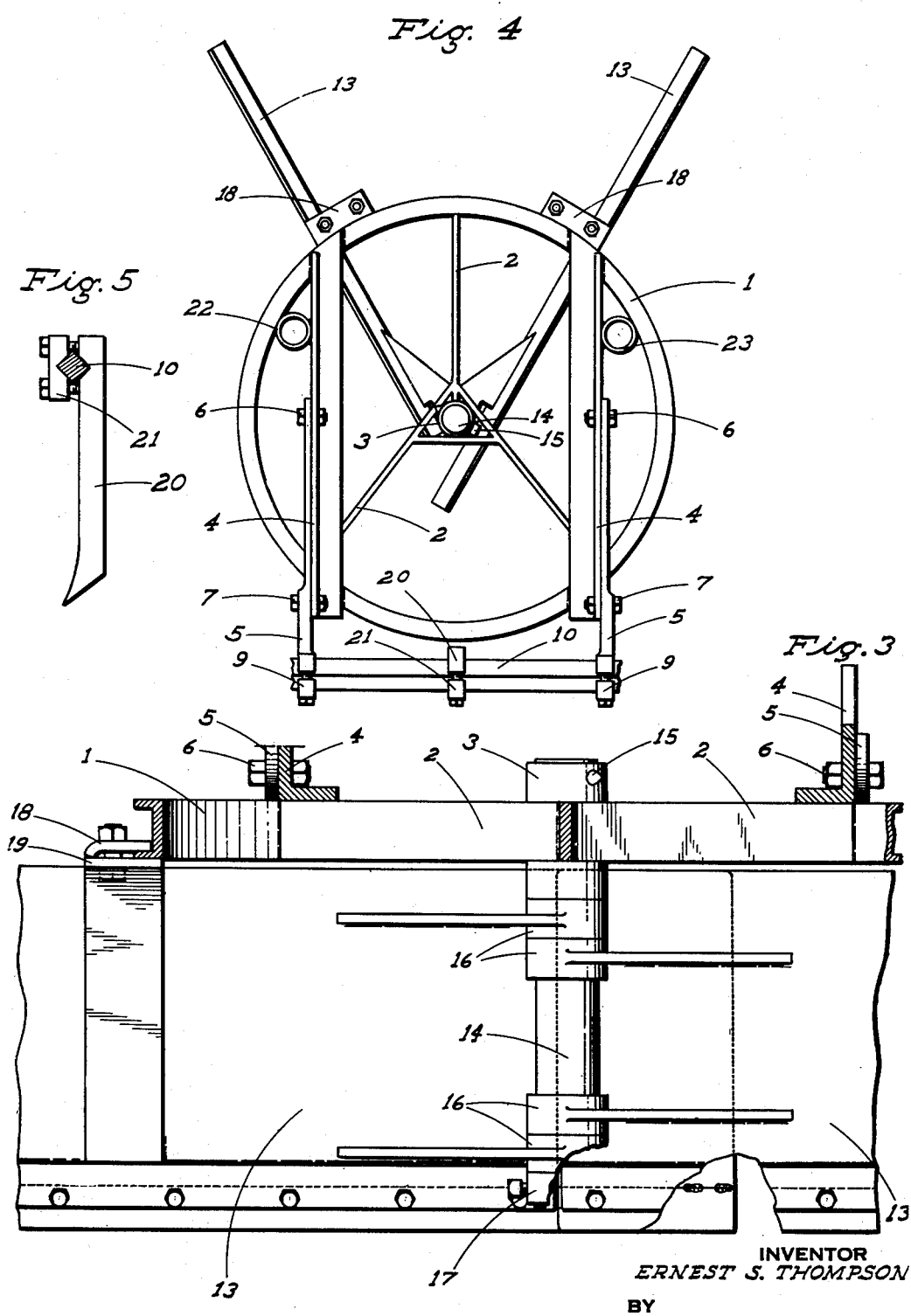

June 12, 1956  E. S. THOMPSON  2,749,631
MULTIPLE, ADJUSTABLE BLADE SCRAPER
Filed Jan. 2, 1953  3 Sheets-Sheet 3

INVENTOR
ERNEST S. THOMPSON
BY
Webster & Webster
ATTORNEYS

United States Patent Office 2,749,631
Patented June 12, 1956

2,749,631

MULTIPLE, ADJUSTABLE BLADE SCRAPER

Ernest S. Thompson, Strathmore, Calif., assignor to himself and Ethel Thompson, jointly Application January 2, 1953, Serial No. 329,429

2 Claims. (Cl. 37—156)

The present invention is directed to, and it is a major object to provide, a drag scraper of novel construction and function; the implement being especially designed, but not limited, for use in connection with a vertically adjustable transverse tool bar secured to a power lift type hitch of a tractor or a tractor pulled, wheel-supported tool carrier.

Another important object of this invention is to provide a scraper, of the type described, which embodies a pair of scraper blades, and a novel mount arranged to permit of selective adjustment of said blades to sundry cooperative working positions adapted for different earth working operations.

An additional object of the invention is to provide a scraper, as in the preceding paragraph, wherein the mount is readily and conveniently adjustable to dispose the scraper blades in selected positions of adjustment.

Another object of the invention is to provide a scraper, with dual blades, which is selectively adjustable to set such blades end to end to serve as a single blade unit, but at any working angle to the direction of travel for general scraping or leveling operations; to set the blades in rearwardly diverging relation without a gap between the forward ends for terracing or ditching; or to set the blades in forwardly diverging relation with a gap between the rear ends for border building or closing of head ditches.

A further object of the invention is to provide a mount, for the blades, which is adjustable to alter the tilt of the blades in the direction of travel; such tilt being changed for different kinds of earth working.

It is also an object of the invention to provide a multiple, adjustable blade scraper which is designed for ease and economy of manufacture.

Still another object of the invention is to provide a practical, reliable, and durable multiple, adjustable blade scraper, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the implement as in use with the scraper blades set end to end as a single or straight scraper blade unit.

Fig. 2 is a longitudinal sectional elevation on line 2—2 of Fig. 1.

Fig. 3 is an enlarged fragmentary transverse section on line 3—3 of Fig. 1.

Fig. 4 is a plan view of the implement as in use with the scraper blades set in rearwardly diverging relation.

Fig. 5 is a fragmentary transverse section on line 5—5 of Fig. 4.

Figure 6:
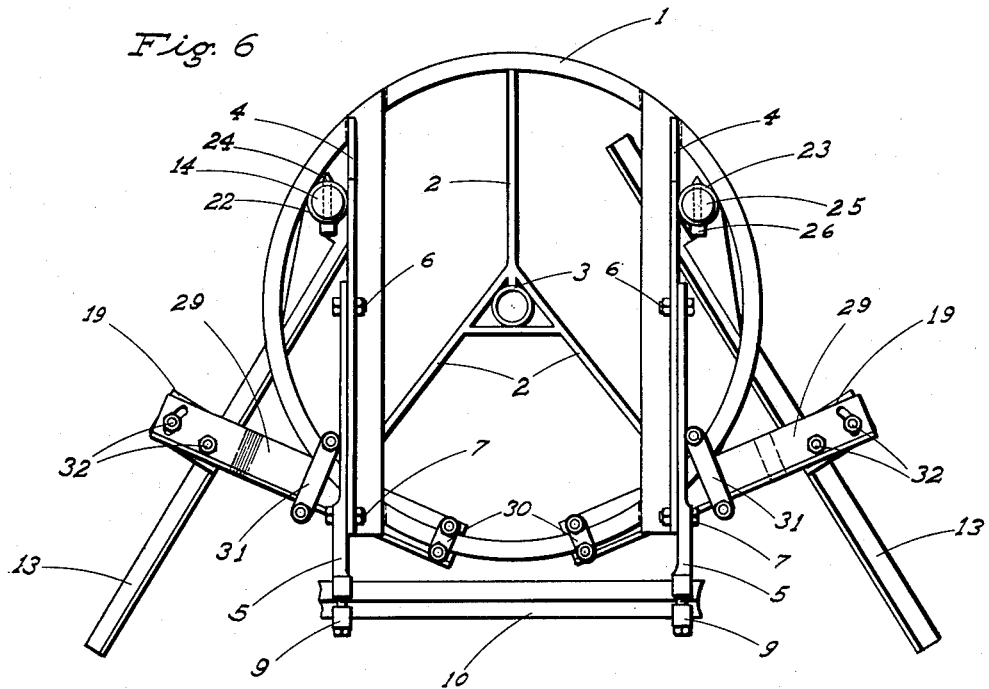
Fig. 6 is a plan view of the implement as in use with the scraper blades set in forwardly diverging relation.

Referring now more particularly to the characters of reference on the drawings, the implement comprises a generally horizontal mounting frame or ring 1 formed of outwardly opening channel iron, and a spider 2 is fixed in said ring; the center of the spider having a perpendicular mounting sleeve 3 secured therein.

On top the ring 1 is fitted a pair of longitudinal, transversely spaced attachment bars 4 which extend chordally on opposite sides of said ring. Draft arms 5 are pivoted at their rear ends, as at 6, to corresponding attachment bars 4 centrally of the ends of the latter, and thence said draft arms project forwardly to a front end termination ahead of the ring 1 and said bars. For the purpose later described, the bars 4 and draft arms 5 are relatively vertically adjustably secured ahead of the pivots 6 by cross bolts 7 on the arms and engaged through arcuate slots 8 in the bars.

At their forward ends the draft arms 5 are connected by clamps 9 to a transverse tool bar 10; the latter being here shown as attached to a power lift type hitch 11 of a tractor 12. The mounting frame 1 is thus vertically adjustably supported above the ground and for forward movement by the tractor.

A pair of scraper blades 13 are disposed beneath the mounting ring 1, and are selectively adjustably attached to the same as follows:

A spindle 14 is removably secured in the central mounting sleeve 3 by means of a cross pin 15, and said spindle depends some distance below the sleeve to receive thereon, in engaged relation, corresponding upper and lower collars 16 fixed on the back side of the scraper blades 13. A retention collar 17, on the lower end of spindle 14, prevents the collars 16 from downward escape.

The collars 16 on one blade 13 are short of its inner end whereby when the blades are in a substantially straight line setting or assembly, as in Fig. 1, the adjacent ends of the blades are lapped.

In such straight line setting, the blades may be used at a right angle to the line of travel, as in full lines in Fig. 1, or in any selected position diagonal to said line, as is shown—for example—in dotted lines in said figure.

The spindle 14 serves as the pivotal axis of the blades when in such straight line assembly, and the blades are each secured to the mounting ring 1 by means of clamps 18 which engage the lower flange of said ring as shown; each clamp 18 including, on the under side, a horizontal wing plate 19 fixed with the corresponding blade.

To adjust the blades 13 about the spindle 14 as an axis, the clamps 18 are merely loosened, slid along the engaged flange of the mounting ring 1 to proper position, and then retightened.

The blades 13, when in straight line setting, either at a right angle to the line of travel or diagonal thereto, are used for general scraping operations; the working height being controlled by hitch 11, and the tilt of the blade adjusted by the relative angular setting, by bolts 7, between bars 4 and draft arms 5.

Certain kinds of earth working, such as ditching, require blades set in rearwardly diverging relation, and here this is easily accomplished, as shown in Fig. 4. The clamps 18 are engaged toward the rear of mounting ring 1, with the blades diverging rearward from spindle 14; the inner end of one blade being ahead of and intersecting the path of the adjacent end of the other blade.

If desired, a ripper tooth 20 may be clamped, as at 21, to the tool bar 10 in a depending position to run directly ahead of the apex of the blades 13 when set as in Fig. 4.

Figure 7:
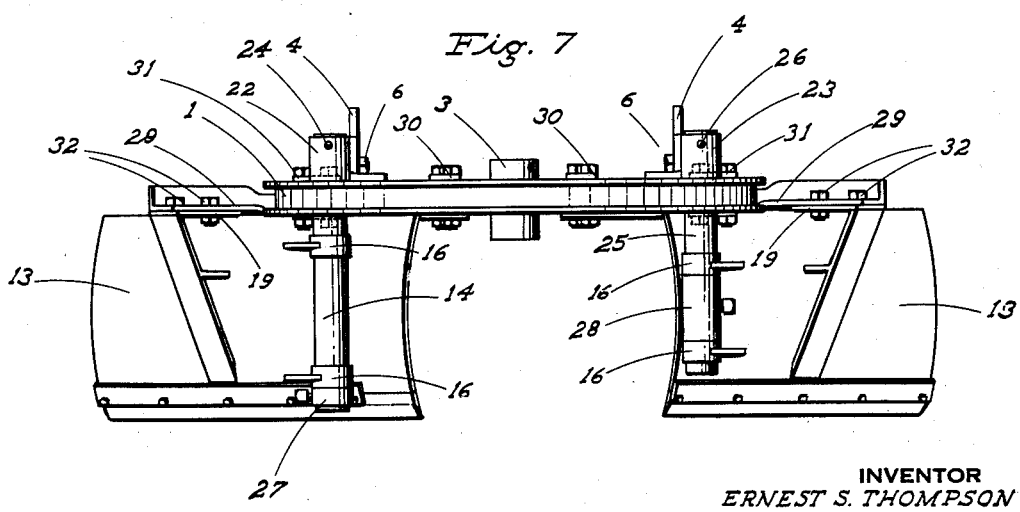
Fig. 7 is a rear end view of the implement with the blades set as in Fig. 6.

For border building or closing of head ditches, the blades 13 are set in forwardly diverging relation, with a gap between their rear ends, as shown in Figs. 6 and 7. This setting is accomplished as follows:

The mounting ring 1 is fitted toward the rear and on opposite sides with perpendicular mounting sleeves 22 and 23; the spindle 14 being removed from mounting sleeve 3 and replaced in mounting sleeve 22, depending therefrom and being removably secured by a cross pin, as at 24. A separate spindle 25 is removably secured in mounting sleeve 23, by a cross pin 26, and depends from said sleeve parallel to the spindle 14.

The spindles 14 and 25 receive the collars 16 of the corresponding blades 13, the collars being retained on said spindles by retention collars indicated at 27 and 28. From the spindles 14 and 25 the blades diverge forwardly intersecting the mounting ring 1 and projecting some distance outwardly therefrom. Stay bars 29 are clamped, as at 30 and 31, to the mounting ring 1 at the front and thence extend substantially tangentially therefrom to the related blades 13, being attached on the wing plates 19 by adjustable pivotal connections, as at 32. The remainder of the clamps 18 are removed when the wing plates 19 are so used.

With multiple blades, mounted for ready adjustment to sundry different working positions, as described, the present invention provides for the effective accomplishment of a number of earth working operations which conventionally require separate implements; there being, as a consequence, an appreciable reduction in initial cost, and a substantial saving of time and labor when the invention is in use.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A scraper comprising a generally horizontal frame which includes a continuous circular member having an outwardly projecting flange extending thereabout, draft members connected to the frame above and clear of said flange, a blade unit beneath the circular member and comprising separate blades disposed in a common horizontal plane, means mounting the blades on the frame for separate adjustment about the axis of said circular member, and means for each blade to releasably clamp the same to the flange.

2. A scraper comprising a generally horizontal frame which includes laterally opposed large-arc concentric circular portions, draft members connected to the frame, a blade unit beneath the frame, said blade unit comprising separate blades disposed in a common horizontal plane, and extending at their outer end beyond the corresponding circular portions of the frame, releasable means securing each blade to the corresponding circular frame portion, and means to mount the blades on the frame for separate rotatable adjustment about the axis of said circular frame portions; said means comprising a depending pivot pin behind the blades and fixed on the frame at said axis and vertically offset collars on the back of the blades separately turnably engaging the pin, the collars of one blade being secured thereon at the inner end thereof and the collars of the other blade being secured thereon short of the inner end thereof and spaced from the back face of said other blade, relative to the spacing of the collars of said one blade relative thereto, so that the blades may be turned about the pin to dispose them in longitudinal alinement with each other and with one blade overlapping the other.

References Cited in the file of this patent

UNITED STATES PATENTS

| | | |
|---|---|---|
| 1,799,424 | Jersey | Apr. 7, 1931 |
| 1,845,851 | Skogsberg | Feb. 16, 1932 |
| 1,966,936 | Schermerhorn | July 17, 1934 |
| 2,141,693 | Murphy | Dec. 27, 1938 |
| 2,311,551 | Laird | Feb. 16, 1943 |
| 2,346,757 | Horner | Apr. 18, 1944 |
| 2,548,139 | Berry | Apr. 10, 1951 |
| 2,590,143 | Adams et al. | Mar. 25, 1952 |
| 2,622,349 | Kinnan | Dec. 23, 1952 |
| 2,644,252 | Brown | July 7, 1953 |
| 2,706,881 | McDonald | Apr. 26, 1955 |

FOREIGN PATENTS

| | | |
|---|---|---|
| 9,880 | Great Britain | of 1899 |